T. A. PEEBLES.

FURNACE.

APPLICATION FILED DEC. 14, 1921.

Reissued July 4, 1922.

15,399.

3 SHEETS—SHEET 1.

WITNESSES

J. Hale Bradley.

INVENTOR

Thomas A. Peebles by Damon S. Wolcott

Atty

T. A. PEEBLES.

FURNACE.

APPLICATION FILED DEC. 14, 1921.

Reissued July 4, 1922.

15,399.

3 SHEETS—SHEET 2.

INVENTOR

Thomas A. Peebles,
by Damon L. Wolcott
Atty

WITNESSES

J. Hebel Bradley.

T. A. PEEBLES.

FURNACE.

APPLICATION FILED DEC. 14, 1921.

Reissued July 4, 1922.

15,399.

3 SHEETS—SHEET 3.

WITNESSES

J. Hobart Bradley.

INVENTOR

Thomas A. Peebles by Darwin S. Wolcott

Atty

UNITED STATES PATENT OFFICE.

THOMAS A. PEEBLES, OF PITTSBURGH, PENNSYLVANIA.

FURNACE.

15,399. Specification of Reissued Letters Patent. Reissued July 4, 1922.

Original No. 1,338,694, dated May 4, 1920, Serial No. 218,246, filed February 20, 1918. Application for reissue filed December 14, 1921. Serial No. 522,403.

*To all whom it may concern:*

Be it known that I, THOMAS A. PEEBLES, residing at Pittsburgh, in the county of Allegheny and State of Pennsylvania, a citizen of the United States, have invented or discovered certain new and useful Improvements in Furnaces, of which improvements the following is a specification.

The invention described herein relates to certain improvements in furnaces for boilers, etc., and has for its object the distribution of air for combustion to different portions of the fuel bed and preheating the air delivered to the point of preliminary or initial combustion and portions adjacent thereto, the preheating being preferably effected by causing the air to flow through members of the fuel supporting means. The invention is hereinafter more fully described and claimed.

Figure 1:
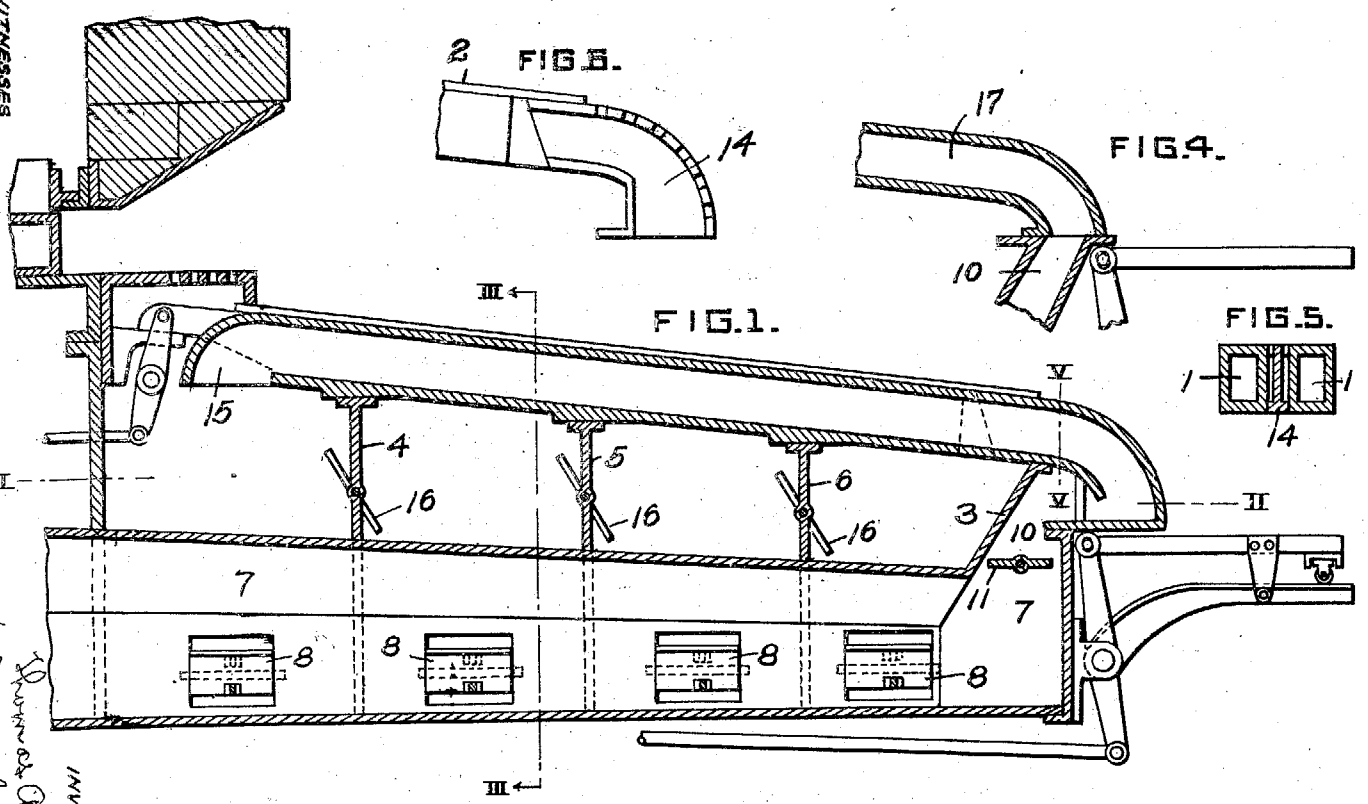
Figure 2:
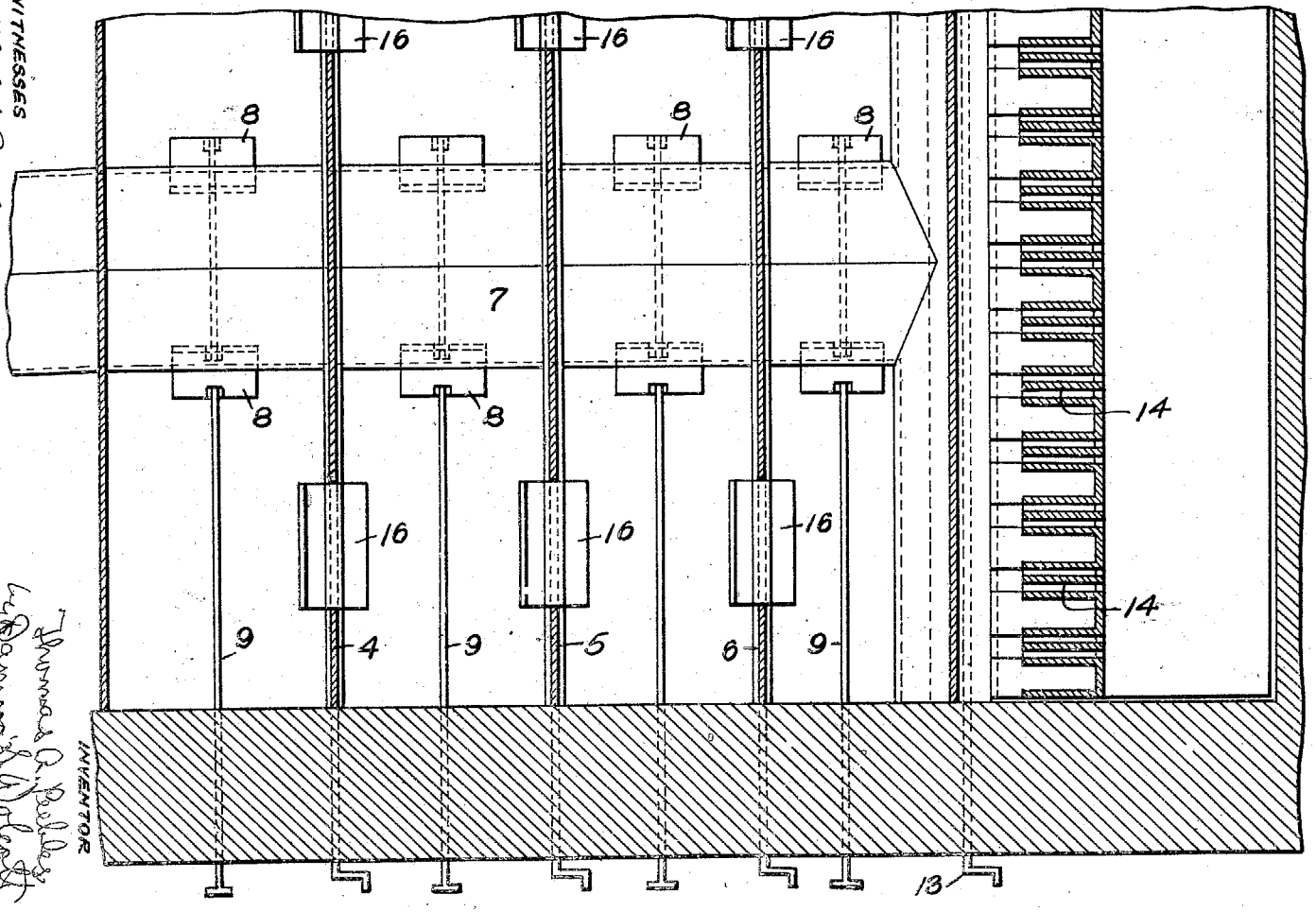
Figure 3:
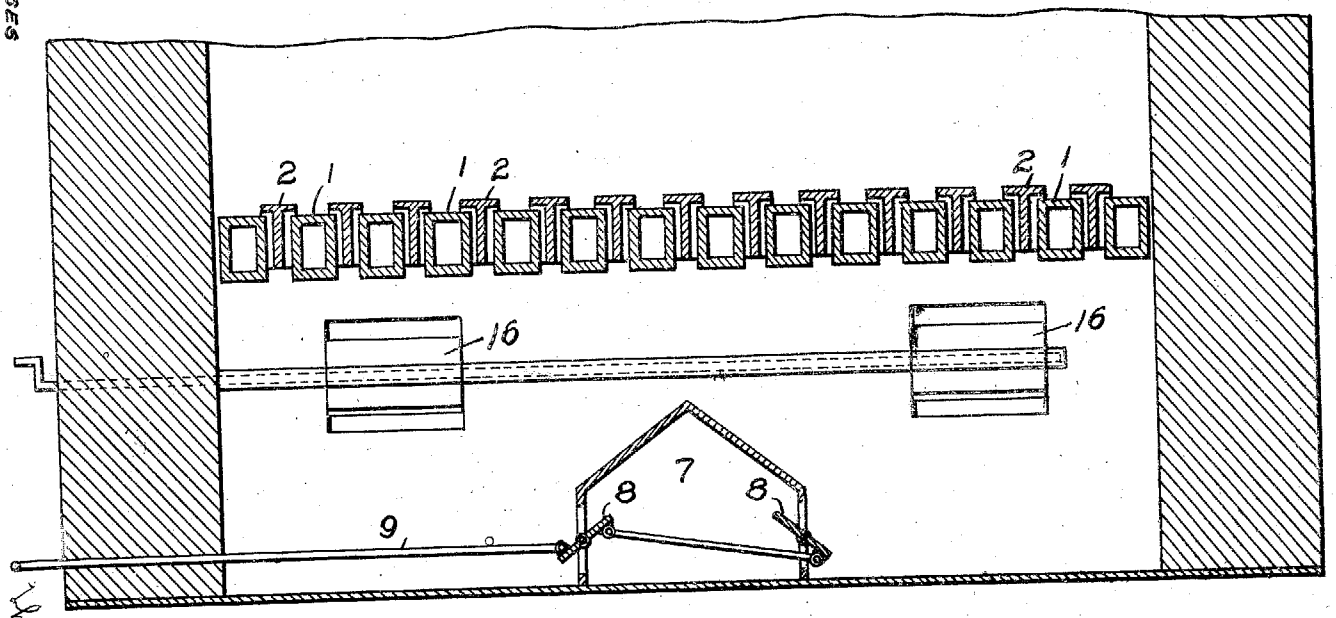

In the accompanying drawings forming a part of this specification, Fig. 1 is a sectional elevation illustrating my improvement as embodied in a construction of furnace and stoking mechanism; Fig. 2 is a sectional plan of a portion of the furnace on a plane indicated by the line II—II, Fig. 1; Fig. 3 is a transverse section on a plane indicated by the line III—III, Fig. 1, certain portions which would show an elevation being omitted; Fig. 4 is a sectional detail view illustrating a modification; Fig. 5 is a sectional detail view, the plane of section being indicated by the line V—V, Fig. 1, and Fig. 6 is a detail view showing the construction and arrangement of the filling pieces intermediate the hollow bars.

In the construction shown the fuel is fed by any suitable means onto and across the forehearth and onto the front end of the main fuel supporting surface consisting of relatively movable members. In the construction shown these members consist of a series of hollow bars 1 and a series of T-shaped bars 2 alternating with the hollow bars and adapted to be reciprocated as described and shown in Figs. 1 and 3. The hollow bars are spaced such a distance apart that the webs of the T-shaped bars, which are supported by the hollow bars, will project down between adjacent bars while the heads of the T-shaped bars are made of such widths as to bridge or extend across the spaces between the bars 1; and the adjacent faces of the bars of the two series are so grooved or otherwise constructed as to permit of the free flow of air between the bars and into the fuel.

The front ends of the two series of bars project under the forehearth which is perforated as is frequently the practice, for the passage of air into the overlying fuel. In the construction shown, provision is made for reciprocating the T-shaped bars, as for example, by oscillating levers having their upper ends engaging the T-shaped bars. The hollow bars are supported at or adjacent to their ends by a flanged plate 3 extending transversely of the furnace and at intermediate points by the partition plates 4, 5 and 6, which divide the space under the fuel supporting members into a plurality of transverse compartments or chambers to suit requirements regarding the distribution of air to different portions of the fuel bed.

The hollow grate bars which are employed for heating the air prior to its passing into the fuel as hereinafter described, are in communication at points adjacent to their rear or discharge ends with an air supply conduit 7 adapted to be connected with a fan or other air compressing means. The conduit is adapted to communicate with the compartments under the fuel supporting members and to that end it preferably extends through the compartments and is constructed with an inverted V-shaped top so that ashes, etc., passing through the fuel supporting surfaces will slide down to the bottoms of the compartments. In order that the flow of air from the compartments between the grate bars into the fuel bed may be controlled to suit the conditions at different points of the fuel bed, provision is made for the independent regulation of the flow of air into each chamber from the supply conduit.

In the construction shown herein communication between the conduit and the several compartments is formed by openings in the side walls of the conduit and the flow of air through such openings is controlled by valves 8 adapted to be shifted by handles 9 extending through the side walls of the furnace as shown in Figs. 2 and 3. Communication between the air conduit and the inlet ports of the hollow bars is formed by a distributing chamber 10 extending transversely of the members forming the fuel support.

The flow of air into the distributing chamber is controlled by a suitable valve mechanism such for example as that shown, consisting of a pivotally mounted damper 11 arranged across the conduit and adapted to be shifted by a handle 13 extending through the side wall of the furnace as shown in Fig. 2. In order to prevent the air from escaping from the distributing chamber through the spaces between adjacent bars, filling pieces 14 are arranged betwen the hollow bars, said filling pieces being provided with ribs along their peripheries adapted to contact with the side walls of the hollow bars and extending forwardly beyond the front wall of the distributing chamber as clearly shown in Figs. 1, 2, 5 and 6.

The air enters the hollow bars from the distributing chamber, flows forwardly and passes through ports 15 in the undersides of the hollow bars into the first compartment underlying the forehearth and the front portions of the grate bars where initial combustion occurs. From this compartment, the heated air passes up into the fuel where initial combustion is taking place. If the damper 16 in the partition 4 is closed, all the air flowing through the hollow bars will pass directly into the fuel at the front of the furnace supported by the foreplate and the portions of the grate bars adjacent thereto, but by opening the dampers 16 in one or more of the partitions between the compartments, a portion of the heated air may be directed through other portions of the bed of fuel.

As is well known to those skilled in the art, combustion of fuel is promoted by heating the air supplied for that purpose and this end is attained in improvements described herein, as the air flowing through the hollow bars will be highly heated by the time it enters the first compartment from which it passes into that portion of the fuel bed where initial combustion occurs at which point the greatest benefit can be derived by the use of heated air. As the fuel above the compartments other than the first will be in a high state of combustion, the benefit arising from the use of heated air for the combustion of these highly heated portions of the fuel bed, will not be so great or pronounced as where initial combustion occurs, and hence under ordinary conditions air will be supplied to the compartments other than the first, directly from the conduit. By suitably adjusting the valves, 8, the amount of air and its pressure supplied to different parts of the fuel bed can be regulated in accordance with the condition of the different parts of the fuel bed. The volume of air supplied to the portions of the fuel undergoing initial combustion and the pressure of the air are controlled by the valve 11.

It will be understood that the improvement described and claimed herein can be readily used in combustion with forms or constructions of fuel supporting means other than the specific construction and arrangement herein shown and described. As for example, in Fig. 4 is shown a construction wherein provision is made for the flow of air into movable hollow grate bars 17 in case it should be desirable to substitute such bars for the T-shaped bars shown in Figs. 1 and 3.

It being common in the art to employ perforated forehearths which support the fuel as it enters the furnace, no claim is made herein to such construction per se.

I claim herein as my invention:

1. In a furnace the combination of spaced fuel supporting members, a plurality of chambers arranged transverse of and below the fuel supports and adapted to supply air to different portions of the bed of fuel on said supporting members, means for feeding heated air to the chamber underlying the portions of the fuel supporting members on which initial combustion occurs and means for supplying air to the other chambers.

2. In a furnace the combination of spaced fuel supporting members, a plurality of air chambers arranged transversely of and below different portions of the fuel supporting members, means for supplying air to the respective chambers, means for independently regulating the flow of air to the respective chambers and means for heating the air flowing to the chamber underlying the portion of the fuel supporting members on which initial combustion occurs.

3. In a furnace the combination of spaced fuel supporting members, a plurality of air chambers arranged below different portions of the fuel supporting members, an air supply, means for heating the air flowing to the chamber underlying the portions of the fuel supporting members on which initial combustion occurs, and valve controlled means for conducting heated air from said chamber to chambers underlying other portions of the fuel supporting members.

4. In a furnace the combination of spaced fuel supporting members, a portion at least of said members having passages therein, air supplying means in communication with said passages at points remote from the front ends of the members, a chamber underlying the front portions of the fuel supporting members and connected to said passages at points adjacent to the front portions of the fuel supporting members, whereby air may be heated prior to its passage into the portion of the fuel bed in which initial combustion occurs.

5. In a furnace the combination of a fuel supporting surface consisting of spaced bars, a portion at least of said bars having passages therein, a plurality of chambers arranged under the fuel supporting surface, air supplying means, a conduit communicating with said air supplying means and communicating with the passages in the fuel supporting surface at points remote from the front portion of said surface, connections from such passages to the chamber underlying the portion of the fuel supporting surface on which initial combustion occurs, and valved connections from the conduit to the other chambers underlying the fuel supporting surface.

6. In a furnace the combination of a wind box having a plurality of compartments, spaced fuel supporting members arranged transversely of the compartments, a portion of said members having longitudinal passages, a conduit communicating with the passages in the fuel supporting members at points adjacent to the rear ends of the fuel supporting members, said fuel supporting members having ports adjacent to their front ends for the flow of air from the bars into the underlying compartment, connections from the conduit to each of the compartments and means for regulating the flow of air from the conduit to the respective compartments.

7. In a furnace the combination of a plurality of compartments, spaced fuel supporting members above and transverse of the compartments, alternate members having longitudinal passages, an air conduit extending through the compartments and having valved connections therewith and having a valved connection with the passages in the fuel supporting members, said members having ports adjacent to their front ends for the flow of air into the underlying compartment.

8. In a stoker furnace the combination of fuel supporting means consisting of spaced members and perforated portions for supplying air for initial combustion, a plurality of chambers arranged transversely of and below the fuel supporting means, means for feeding heated air supplied to the chamber underlying the portions of the fuel supporting means on which initial combustion occurs, and regulable means for supplying air to a chamber underlying intermediate portions of the fuel supporting means.

9. In a stoker furnace the combination of fuel supporting means consisting of spaced members and perforated portions for supplying air for initial combustion, a chamber arranged transversely of the fuel supporting means and underlying the portions of such means where initial combustion occurs, means for supplying heated air to said chamber and regulable means for supplying air below the spaced members.

10. In a stoker furnace the combination of fuel supporting means consisting of spaced members and perforated portions for supplying air for initial combustion, a plurality of chambers arranged transversely of and below the fuel supporting means, means for heating the air supplied to the chamber underlying the portions of the supporting means on which initial combustion occurs, regulable means for conducting the supply of air to a chamber adjacent to the first chamber, and a regulable communication between said chambers.

11. In a stoker furnace the combination of fuel supporting means, consisting of spaced tubular members and perforated portions for supplying air for initial combustion, a plurality of chambers arranged transversely of and below the fuel supporting means, ports whereby air flowing through the tubular members may flow into the chamber underlying the portions of the fuel supporting means on which initial combustion occurs, means for supplying air to the tubular members and regulable means for supplying air to a chamber underlying intermediate portions of the fuel supporting means.

12. In a stoker furnace the combination of fuel supporting means consisting of spaced tubular members and perforated portions for supplying air for initial combustion, the tubular members having inlet and outlet ports in their undersides, a series of chambers arranged below and transversely of the tubular members, the end chambers communicating respectively with the inlet and outlet ports of the tubular members, the chamber communicating with the outlet ports underlying the portions of the fuel supporting means on which initial combustion occurs, and regulable means for supplying air to all of said chambers.

13. In a stoker furnace the combination of a fuel supporting means consisting of spaced tubular members and perforated portions for supplying air for initial combustion, the tubular members having inlet and outlet ports in their undersides, a series of chambers arranged below and transversely of the tubular members, the chambers at the end of said series being in communication with the inlet and outlet ports respectively, the chamber communicating with the outlet port underlying the portions of the fuel supporting means on which initial combustion occurs, and regulable means for supplying air to the chambers in the rear of the chamber communicating with the outlet ports of the tubular members.

14. In a stoker furnace the combination of fuel supporting means consisting of members spaced to permit the upward passage of air and perforated portions for the passage of air for initial combustion, a plurality of chambers arranged transversely of and below different portions of the fuel supporting means, means for supplying air to the respective chambers, means for independently regulating the flow of air to the respective chambers and means for heating the air flowing to the chamber underlying the portion of the fuel supporting means where initial combustion occurs.

15. In a stoker furnace the combination of fuel supporting means consisting of spaced members and perforated portions for supplying air for initial combustion, a plurality of chambers arranged transversely of and below the fuel supporting means, means for feeding heated air for initial combustion, and to one end of the chamber underlying the fuel supporting means, means for controlling the flow of heated air from said chamber to a chamber underlying intermediate portions of the fuel supporting means.

16. In a stoker furnace the combination of fuel supporting means consisting of spaced tubular members and perforated portions, the tubular members having inlet and outlet ports in their undersides, a plurality of chambers arranged below and transversely of the tubular members, a chamber of the series being connected to the outlet ports of the tubular members and a regulable connection from said chamber to the chamber underlying intermediate portions of the tubular members.

17. In a stoker furnace the combination of fuel supporting means having spaced tubular members and portions adapted to direct jets of air into the fuel adjacent to the point of initial combustion, the tubular members having inlet and outlet ports in their undersides and adjacent to the respective ends of the tubular members, a plurality of chambers below the fuel supporting means, the chamber under the fuel receiving ends of the supporting means communicating with the outlet ports of the tubular members and with a jet-directing means, and a regulable connection between said chamber and a chamber under portions of the tubular members intermediate the inlet and outlet ports.

In testimony whereof I have hereunto set my hand this 23 day of November, 1921.

THOMAS A. PEEBLES.